(12) United States Patent
Craig, Jr.

(10) Patent No.: US 7,024,731 B2
(45) Date of Patent: Apr. 11, 2006

(54) HOSE CLAMP WITH INTERNAL CLAMPING SURFACES DEVOID OF GAPS, STEPS OR DISCONTINUITIES

(75) Inventor: Paul M. Craig, Jr., Silver Spring, MD (US)

(73) Assignee: Hans Oetiker A.G Maschinen und Apparatefabrik, Horgen (CH)

( * ) Notice: Subject to any disclaimer, the term of this patent is extended or adjusted under 35 U.S.C. 154(b) by 15 days.

(21) Appl. No.: 10/683,429

(22) Filed: Oct. 14, 2003

(65) Prior Publication Data

US 2004/0134042 A1 Jul. 15, 2004

Related U.S. Application Data

(60) Provisional application No. 60/439,799, filed on Jan. 14, 2003.

(51) Int. Cl.
*B65D 63/02* (2006.01)
*F16L 33/025* (2006.01)

(52) U.S. Cl. .................................. 24/20 CW; 24/20 R

(58) Field of Classification Search ............ 24/20 CW, 24/19, 20 R, 20 S, 20 W, 23 R, 20 EE
See application file for complete search history.

(56) References Cited

U.S. PATENT DOCUMENTS

| 4,724,583 | A | * | 2/1988 | Ojima | 24/20 CW |
| 5,251,360 | A | * | 10/1993 | Putz | 24/20 CW |
| 5,537,721 | A | * | 7/1996 | Oetiker | 24/20 CW |
| 5,544,392 | A | * | 8/1996 | Oetiker | 24/20 CW |
| 6,023,815 | A | * | 2/2000 | Sauer | 24/20 CW |
| 6,247,206 | B1 | * | 6/2001 | Craig, Jr. | 24/20 CW |
| 6,598,269 | B1 | * | 7/2003 | Oetiker et al. | 24/20 CW |

* cited by examiner

*Primary Examiner*—Robert J. Sandy

(57) ABSTRACT

A clamp in which the clamping band end portions are intended to form overlapping inner and outer band portions in the installed condition and are connected by a connection, in which a tightening device for tightening the clamping band about an object to be fastened and an arrangement assuring gap-free and stepless internal clamping surfaces of the clamping band including a male member near the end of the inner band portion are provided whereby the male member is adapted to cooperate with a female member in the outer band portion; a guide arrangement is further formed by a bent-up tab-like member on each side of the male member and adapted to engage in two guide slots of the outer band portion to guide relative movements of the inner and outer band portions during tightening of the tightening device; the connection may also include a lost-motion arrangement permitting initial plastic deformation of the tightening device substantially without change in radial dimension.

24 Claims, 4 Drawing Sheets

HOSE CLAMP WITH INTERNAL CLAMPING SURFACES DEVOID OF GAPS, STEPS OR DISCONTINUITIES

INTRODUCTION

This application is a continuation application of my Provisional Application Ser. No. 60/439,799, filed on Jan. 14, 2003, entitled "Hose Clamp With Internal clamping Surfaces Devoid Of Gaps, Steps Or Discontinuities And To A Method Of Making The Same," (D/21588) the subject matter of which is incorporated herein in its entirety by reference. I claim the right of priority of said Provisional Application and its filing date of Jan. 14, 2003, with respect to all common subject matter between the instant application and said Provisional Application.

FIELD OF THE INVENTION

The present invention relates to hose clamps, especially to open-type hose clamps with internal clamping surfaces devoid of any gaps, steps or discontinuities, which improves the guidance of the relative movement between inner and outer overlapping band portions by simple and effective means, which enables an economic manufacture as regards length of clamping band required for a given size clamp, and to the method of making such clamps involving only simple manufacturing procedures with already available materials.

BACKGROUND OF THE INVENTION

With the use of new, relatively harder and thinner plastic hose materials, it became important, especially with so-called open-type hose clamps made from galvanized or stainless steel band material, to provide internal clamping surfaces devoid of any step, gap or discontinuity, particularly at the end of the inner overlapped clamping band portion. Additionally, with a tightening device forming a gap under the same, such as, for example, with so-called "Oetiker" ears, it became important in the tightened condition of the clamp to bridge the gap underneath the tightening device by the full band width of the inner clamping band portion to avoid a leakage problem. An effective solution, which proved commercially immensely successful and which has been used in hundreds of millions of clamps, is described in U.S. Pat. No. 4,299,012 which, as shown in FIG. 1 of this application and corresponding to FIG. 19 of this patent, includes a male member in the form of a narrow tongue-like extension (61) at the end of the full width inner band portion (11b) adapted to engage through an opening (62) forming a female member that commences in the outer band portion (11a) at the beginning of a step-like portion (67) having a height substantially corresponding to the thickness of the clamping band. In addition to a typical "Oetiker" ear, generally designated by reference numeral (13) which consists of two parallel, outwardly extending leg portions (14 and 15) interconnected by a bridging portion (16) provided with a reinforcing groove or depression (17), this type of prior art clamp (FIG. 1 herein) also shows a mechanical connection consisting of a so-called guide or suspension hook (31) and of two cold-deformed, deep-drawn support hooks (32) adapted to engage in apertures (35) in the outer band portion (11a). The channel (63) adjoining the opening in the step-like portion (67) is formed by cuts whereby the cover (63) is pressed out relative to the remaining lateral band portions (11'). However, the cover (63) can also be omitted by simply cutting off the material forming the opening in the channel so that the tongue-like extension (61) is then freely exposed to the outside as disclosed in U.S. Pat. No. 4,315,348.

The use of a so-called combined guide and support hook, formed by a tab-like member pressed out of the inner band portion is disclosed in U.S. Pat. No. 5,305,499 in which the combined guide and support hook (33) is punched and pressed out within the area of the full band width inner band portion (12) and extends at substantially right angle to the outer surface of the band material.

In connection with so-called earless clamps, two pressed-out tool-engaging tab-like members (32) with tool-engaging surfaces (33) are disclosed in U.S. Pat. No. 4,712,278. This patent additionally shows in FIGS. 5 and 6 thereof two tab-like members (130) in substitution of the tool-engaging embossment (30) illustrated in FIGS. 1 through 3 of this patent.

The use of one or more tab-like members pressed-out of the inner band portion and engaging in one or more guide slots to guide overlapping band portions is known as such from U.S. Pat. Nos. 5,339,496 and 5,544,392. However, these tab-like members as disclosed in the prior art are pressed-out within the center area of the full width inner band portion.

In all of the aforementioned prior art hose clamps, the tongue-like portions are realized by simply cutting off lateral band material on both sides whereby these cutaway lateral band portions thus remain unused and are simply wasted.

SUMMARY OF THE INVENTION

It is an object of the present invention to provide a hose clamp of the type disclosed in U.S. Pat. No. 4,299,012 which makes more effective use of the clamping band material, assures a simple, reliable guidance in the relative movement of overlapping band portions, enables a saving in the length of the clamping band required for a given clamp size, and allows a clamp size tolerance range in which, in particular, the maximum diametric dimension of the range can be optimized as well as to an economic method of manufacturing such clamps.

The underlying problems are solved according to the present invention in that at least a part of the tongue-like extension at the end of the inner clamping band portion, which forms the male member, is formed and defined by tab-like members adapted to engage in guide slots in the outer clamping band portion. This arrangement provides a simple low-friction guide arrangement which can be realized without complicated additional manufacturing steps and which reliably guides the overlapping inner and outer band portions during tightening of the tightening device, especially if the teachings of my prior U.S. Pat. No. 6,560,823 are applied as regards the location of the beginning of the male profile at the full band width of the inner clamping band portion.

According to another feature of the present invention, the clamp may also include a lost-motion arrangement that enables savings in clamping band material and an assurance of predetermined clamping force when reaching $d_{max}$. Though the savings may be relatively small, they become significant with the annual large-volume production of these types of clamps, usually in the hundreds of millions of clamps.

BRIEF DESCRIPTION OF THE DRAWINGS

These and further objects, features and advantages of the present invention will become more apparent from the following description when taken in conjunction with the accompanying drawing which shows, for purposes of illustration only, several embodiments in accordance with the present invention, and wherein.

DETAILED DESCRIPTION OF THE DRAWINGS

Figure 1:
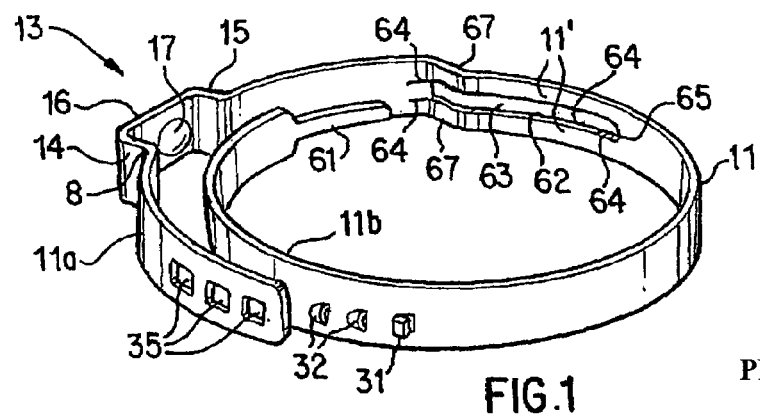
FIG. 1 is a perspective view of a prior art clamp of the type disclosed in U.S. Pat. No. 4,299,012.

Referring now to the drawing wherein like reference numerals are used throughout the various views to designate like parts, it should be recalled, as explained in my U.S. Pat. No. 6,240,603 that practically all of the tensional forces are present in the outer clamping band portion while the overlapped inner clamping band portion is substantially devoid of any tensional forces but provides the internal clamping surfaces within the area of overlap of the two clamping band portions including the area of the tightening device. As also explained in my last-mentioned U.S. patent, with the use of a so-called "Oetiker" ear, it is necessary to plastically deform the ear a predetermined initial amount before the ear properly functions as tightening device. In other words, ignoring compressibility of the hose material, the maximum diametric dimension $d_{max}$ of the tolerance range $d_{max}$–$d_{min}$ of the clamp should not exceed the total range of contraction of the ear-like tightening device less the required initial contraction of the plastically deformable ear to attain proper functioning which will be referred to hereinafter as "initial plastic deformation." The amount of "initial plastic deformation" depends on such factors as dimensions of the ear, the thickness of the clamping band and the type of clamping band material. However, as a general indication, this "initial plastic deformation" for this type of tightening device involves for a typical "Oetiker" ear between about 40% to about 60% of the full tightening range, i.e., of the maximum contraction of the ear. This means, in turn, that the tolerance range of a given size clamp is the amount of plastic deformation left after the point of "initial plastic deformation" of the ear has been reached, i.e., after the ear has reached its predetermined configuration corresponding to its "initial plastic deformation," resembling normally an omega shape. For purposes of convenience of explanation of this invention, it is assumed that the required plastic deformation to reach the "initial plastic deformation" of the plastically deformable ear capable of functioning as tightening device is about 50% of the maximum contraction of the ear. Additionally, leaving aside any compressibility of the hose material and any spring-back of the ear after a contraction, an overlap between the tongue-like portion 61 and the lateral band portions 11' of the outer clamping band portions 10a that remain beyond the step-like portion 67 is necessary, as explained in my prior U.S. Pat. No. 6,457,212, to achieve a stepless transition at the end of the inner clamping band portion when the plastic deformation has reached the beginning of the available tolerance range, i.e., in the assumed example of a clamp of this invention, when 50% of the maximum contraction of the ear has been reached.

Referring now to FIGS. 2–5 of the drawing, the outer band portion 11a again includes an ear generally designated by reference numeral 13 which has two outwardly extending leg portions 14 and 15 interconnected by a bridging portion 16 that is preferably provided with a reinforcement (not shown) of any known type as disclosed, for example, in U.S. Pat. Nos. 5,305,499; 5,339,406 and in my U.S. Pat. No. 6,243,924. The ends of the inner leg portions 14 and 15 where they pass over into the outer band portion 11a are indicated by reference characters B and C while the maximum plastic deformation limited by contact with one another of points B and C is indicated by the distance a. In the assumed example, the "initial plastic deformation" will therefore be reached when a contraction of about a/2 has been reached.

The inner band portion 11b includes a male member in the form of a tongue-like extension 61 the sides of which, according to this invention, are defined at least in part by bent-up tab-like members 21 adapted to engage in guide slots 63'. With the mechanical connection engaged but prior to any contraction of the ear, the end of the full band width inner band portion is indicated at D and is spaced from the leg portion 15 by a small distance e. The beginning of the step-like portion 67, designated by reference character F must then be located from point D by at least a distance corresponding to maximum contraction of the ear, i.e., by a distance a, preferably by a distance $a^+$ in excess of distance a as a precautionary measure.

Figure 2:
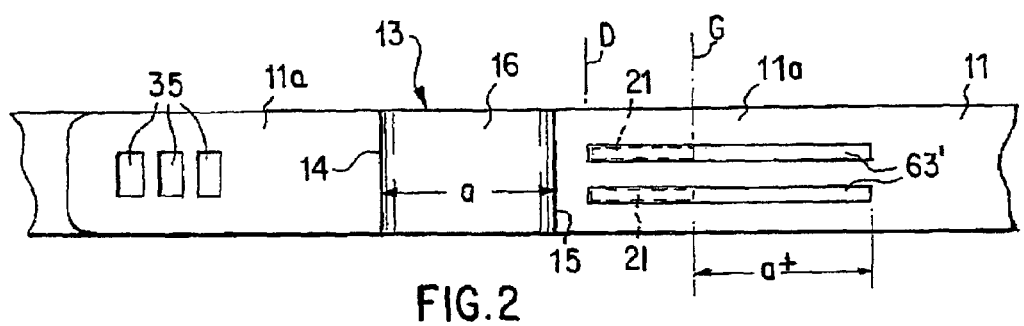
FIG. 2 is a partial somewhat schematic top plan view of a clamp on the area of the outer band portion that includes the mechanical connection and the guide arrangement in accordance with the present invention, in the condition with the mechanical connection engaged but prior to tightening, and flattened out for better understanding, also indicating the location of a plastically deformable ear, the end of the full width inner band portion and the end of the tongue-like extension according to the present invention.
Figure 3:
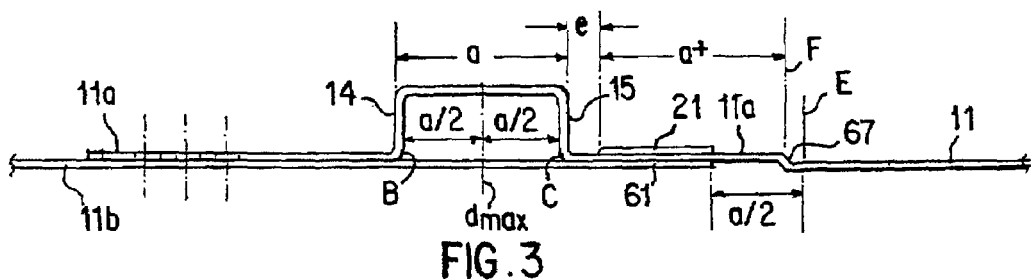
FIG. 3 is a partial somewhat schematic side elevational view, flattened out for better understanding, of the area of the clamp illustrated in FIG. 2 and only schematically indicating the mechanical connection.
Figure 4:
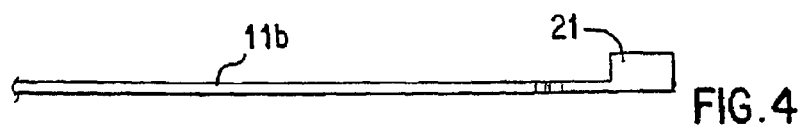
FIG. 4 is a somewhat schematic partial side elevational view of only the inner clamping band portion illustrated in FIG. 3, omitting again the parts of the mechanical connection for the sake of clarity and showing the tab-like members defining a part of the tongue-like extension provided only in the area near the free end of the tongue-like portion.
Figure 5:
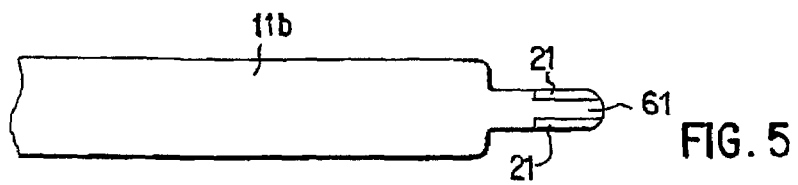
FIG. 5 is a somewhat schematic partial top plan view of the inner clamping band portion of FIG. 4.

The length of the tongue-like portion must then be such that it engages in and overlaps the step-like portion 67 a predetermined distance to assure a stepless transition from the inner band portion to the outer band portion when the tightening device is tightened to the point of its "initial plastic deformation," i.e., by an amount of 50% in the given example. This means that the distance from the inner beginning of the tongue-like extension indicated by reference character D to the free end thereof indicated by reference character G, which represents the length of the tongue-like portion 61, must be at least somewhat greater than one-half the distance a. In other words the free end of the tongue-like extension G must reach point E at a predetermined distance beyond the step-like portion 67 when the tightening device is plastically deformed by an amount of a/2. FIGS. 2 and 3 illustrate an embodiment in which the tab-like members 21 extend over substantially the full length of the tongue-like extension 61. However, the length and location of the tab-like members 21 may also be only near the free end area of the tongue-like extension (FIGS. 4 and 5) to avoid interference with the jaws of the tightening tool or in some cases even in an area intermediate the ends of the tongue-like extension. The length of these tab-like members depends also on the size of the clamp, i.e., with very small clamp sizes, the tab-like members are most likely to extend over substantially the entire length of the tongue-like extension while with larger sizes, they are more likely to extend only over a part of the length of the tongue-like extension 61 to minimize friction during contraction of the ear, preferably only over the free end area of the tongue-like extension to assure proper guidance.

Details of the mechanical connection have been omitted in FIGS. 2 and 3 for the sake of clarity and may be of the type as shown in FIG. 1 herein or may be of any other known type. For example, if a permanent connection is desired, a spot-welded connection may be used with a stainless steel clamping band material and a laser-type spot-welded connection may be used with a galvanized steel clamping band material. Additionally, the mechanical connection may also be as shown in U.S. Pat. Nos. 4,315,348 or 5,305,499 or any other type as known in the prior art.

The invention described in connection with FIGS. 2–5 provides a simple low-friction guide arrangement which is important so that the tongue-like extension remains properly aligned with the window in the step-like portion 67 during contraction of the ear. The inner clamping band portion 11b might otherwise become non-aligned with the window by swerving laterally, thereby causing problems in he proper functioning of the clamp. This is realized according to this invention without additional material, involving already existing cutting operations—changing the cuts for the window in step-like portion 67 into simple cuts forming slots 63'—and a readily realizable bending-up operation while at the same time allowing clamping band material savings of the order attainable with my prior U.S. Pat. No. 6,240,603 B1. The existence of the guide slots 63' also facilitates the realization of the step-like portion 67 and of the remaining cover portion 63. Furthermore, the use of the guide slots 63' in the area of the step-like portion 67 permits optimization in that area, i.e., of the width of the remaining lateral band portions 11' in relation to the width of the tongue-like extension 61.

Figure 6:
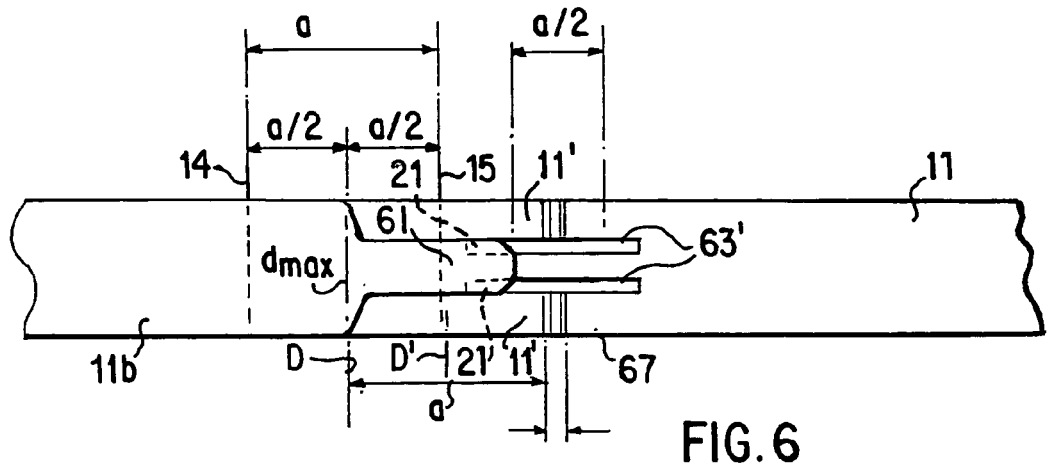
FIG. 6 is a somewhat schematic partial bottom plan view, again flattened out, on the inside of a clamp as disclosed in my copending application Ser. No. 10/044,968, now U.S. Pat. No. 6,560,823, and provided with a guide arrangement of this invention, illustrating the parts thereof with the mechanical connection engaged but prior to contraction of the ear.
Figure 7:
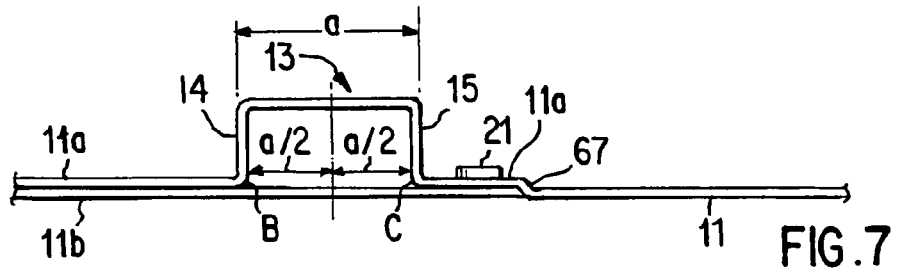
FIG. 7 is a somewhat schematic partial side elevational view of FIG. 6.
Figure 8:
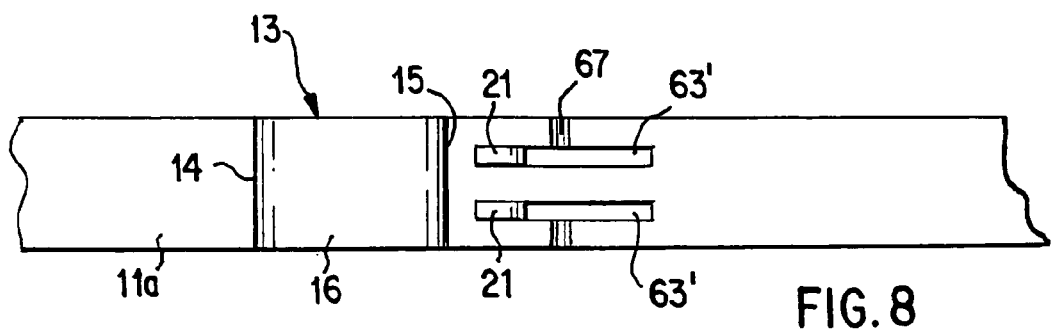
FIG. 8 is a somewhat schematic partial top plan view, similar to FIG. 6.

The guide arrangement according to this invention is of even greater importance in the proper tightening of a clamp, in which the end of the full band width of the inner clamping band portion is located within the area of the tolerance range $d_{max}$ to $d_{min}$ as disclosed in my aforementioned U.S. Pat. No. 6,560,823, the subject matter of which is expressly incorporated herein in its entirety. This is so because in that case the full width of the inner clamping band portion 11b reaches the full width outer clamping band portion only after passing beyond leg portion 15 and thus depends on the safe and continuous alignment of the tongue-like portion 61 with the window in step-like portion 67, FIG. 6 herein, which is based on FIG. 6 of my aforementioned patent, and FIG. 7, which is a side elevational view of FIG. 6, illustrate a guide arrangement with tab-like members 21 and guide slots 63' of the present invention as applied to the material-saving clamp of my U.S. Pat. No. 6,560,823. As explained in this patent, the end of the full band width inner clamping band portion 11b and the beginning of the tongue-like portion 61 is located at point D within the area defined by $d_{max}$ and $d_{min}$ of the tolerance range when the mechanical connection is engaged but prior to contraction of the ear 13, so that the point D' comes to lie at least a small distance beyond the inner end C of leg portion 15 of the ear 13 when the "initial plastic deformation" is reached. The guide arrangement 21, 63' according to this invention is thereby highly desirable if not necessary as it forces the tongue-like extension 61 to proceed along a prescribed linear path during the "initial plastic deformation" and thus avoids misalignment between the tongue-like extension 61 and the opening or window formed in the step-like portion 67. For the sake of economy of clamping band material, the tab-like members 21 are thereby preferably located only in the area of the free end of the tongue-like extension 61 which is of such length as to avoid interference between the jaws of a tightening tool and the tab-like members 21 when the tightening tool is applied to leg portions 14 and 15. As the tab-like members 21 only perform a guide function, they may also be of limited height and/or may be shaped with a slant, preferably resembling the shape of the jaw, to avoid interference with the jaws of the pincer-like tightening tool as schematically indicated at 21a in FIG. 9.

Before describing the embodiment with the lost-motion arrangement of this invention illustrated in FIGS. 10–13, a few words are believed appropriate to explain the underlying theoretical principles of the present invention. Though the "initial plastic deformation" of a typical "Oetiker"-type ear depends on such variable factors as thickness and material used for the clamping band, e.g., stainless steel or galvanized steel, the size of the plastically deformable ear, the size of the clamp, etc., a plastic deformation of about 40% to about 60% is the general rule of thumb to reach the point of "initial plastic deformation." For purposes of explanation, it will be assumed again that the "initial plastic deformation" of the ear is 50%, i.e., is a/2 in FIG. 10 where the maximum plastic deformation of the ear is a, reached when the points B and C (FIG. 3) come into contact with one another. The compressibility of the hose as also any limited spring-back after plastic deformation is ignored because it is inconsequential to the explanation of the present invention.

As mentioned before, an "initial plastic deformation" of the plastically deformable ear by 50% in the given example limits the available tolerance range $d_{max} - d_{min}$ to a theoretical maximum value of 50% of the remaining deformation range of the ear. As known, the circumferential length l of a clamping band required for a given clamp size, i.e., for the circle formed by the clamp at any given moment, is a function of the diameter d and is given by the formula $$l = \pi d$$

where l is the circumferential length of the clamping surfaces in the clamp circle and d is the diametric dimension of the clamp at any given moment of contraction of the ear. If a reduction of the diametric dimension occurs during the entire contraction of the ear, i.e., over the distance a, the length of the clamping band material for the circle of the clamping surfaces would decrease from an initial circle length $l_o$ $$l_o = \pi d_o$$

where $d_o$ is the diametric dimension of the clamp with the mechanical connection engaged but prior to any contraction of the ear, to a length of maximum contraction of the ear $$l_{min} = \pi d_{min}$$

where $d_{min}$ is the minimum diametric dimension of the tolerance range of a given clamp size, i.e., when points B and C are in contact with one another.

Since $l_o - l_{min}$ is about equal to a, the maximum decrease $\Delta d_{max}$ in diametric dimension in the prior art clamps is $$d_o - d_{min} = \frac{\Delta l_{max}}{\pi} \quad (1)$$

where $\Delta l_{max}$ is the maximum change in circumferential length of the circle formed by the clamp in the prior art clamps. It is assumed for purposes of these discussions that the required length of the overlapped inner clamping band portion is the same for different diametric dimensions of a given clamp size. However, this assumption is inconsequential because the required length of the overlapped inner clamping band portion can be decreased as the size of the clamp is decreased so that this assumption favors the present invention. Equation (1) can be rewritten as $$\Delta l_{max} = l_o - l_{min} = \Delta d_{max} \cdot \pi \quad (2)$$

As $l_{min}$ is a fixed value depending on contact with each other of points B and C, $\Delta l$ therefore depends on $l_o$. This means that one could start with an initial reduced clamping band length $l_o$ if one could avoid the reduction in diametric dimension during the "initial plastic deformation." In other words, the clamping band length for a given clamp size could be reduced by about a/2 in the given example if no reduction in diametric dimension occurred during the initial contraction of the ear corresponding to the initial plastic deformation, i.e., corresponding to a/2 in the given example.

One could then start with an initial clamping band length in the assumed example that is $$l_o' = l_o - a/2$$

which means a savings of about a/2 in band material. This is achieved in a modified embodiment of the clamp according to the present invention by a so-called "lost-motion arrangement" as illustrated in FIGS. 10 through 13 in which reference numerals of the 100 series are used for corresponding parts of the embodiment of FIGS. 2–5. In this embodiment, the mechanical connection between the inner and outer clamping band portions is achieved with the use of hooks which are in the form of tab-like members 131 cut and pressed-out on both sides of the inner clamping band portion 111b into a position at substantially right angle to the clamping band surface. The tab-like members 131, which are quite capable to act as support hooks and are preferably in the form of combined guide and support hooks as disclosed in the prior art, are adapted to engage in guide slots 170 which are of greater length by a distance n than the length of the tab-like members 131. The excess length n of the guide slots 170 in the discussed example is preferably at most equal to the value of "initial plastic deformation," in the given example to a/2, but may also be less, depending on various factors, such as desired $d_{max}$, acceptable band length for a given size clamp and the actual value of the "initial plastic deformation," and can be readily determined empirically.

Figure 13:
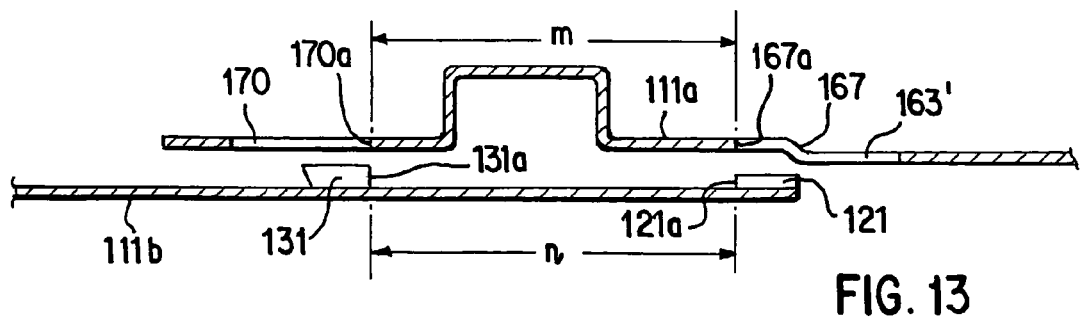
FIG. 13 is a somewhat schematic exploded partial cross-sectional view of the inner and outer clamping band portions of FIG. 11, taken along line 13—13 of FIG. 10 and illustrating the pre-assembly obtainable in the clamp of FIGS. 10–12.

The distance m (FIG. 13) between the ends of the tab-like members 121 and the ends of the tab-like members 131 nearer the tightening device 113 is thereby so chosen that these tab-like members can engage in their respective slots 170 and 163' only when the tab-like members 131 are located in their guide slots 170 in the end area near the tightening device 113, and the tab-like members 121 are located in their guide slots 163' in the end area also near the tightening device 113 (FIG. 13). As the ear 113 is plastically deformed, no reduction in diametric dimension d of the clamp takes place while the lost-motion arrangement is operable, assuming no significant friction between overlapping band portions. Assuming the legs 114 and 115 of the ear 113 are plastically deformed by equal amounts, it means that the tab-like members 121 remain during the lost-motion operation in their relative position engaging the inner ends of guide slots 163' because any movement of the inner end of the leg portion 115 and therewith of the outer clamping band portion 11a to the left in FIG. 11 which would change the relative position of tab-like members 121 is accompanied by an equal counterclockwise movement of the inner clamping band portion 111b and thus of the tab-like members 121 to the left in FIG. 10. In the meantime, movement of the leg portion 114 and with it of the free end of the outer clamping band portion 111a to the right as viewed in FIG. 10, would not affect the position of tab-like members 131 which can still move freely in guide slots 170 even though guide members 131 undergo relative movement in the guide slots 170. It is only when the tab-like members 131 come into engagement with the ends of guide slots 170 away from leg portion 114 that further contraction of the ear 113 will cause the circumferential length of the clamp to decrease. This means in practice that for a given clamp size having a value of $d_{max}$ in the tolerance range, one can design the clamp so that the initial diametric dimension can be reduced in the discussed example by about one-half the distance of maximum contraction of the ear, i.e., by about a/2 in the given example or somewhat less depending on the necessary clearance for a hose diameter of $d_{max}$. The tab-like members 131 move freely in guide slots 170 until they reach their end position furthest away from the leg portion 114. At that point, contraction of the clamp, i.e., reduction of d will commence. This is so as at that point, contraction of the ear will cause the outer band portions on both sides of the ear to move in opposite direction toward the leg portions 114 and 115 of the ear, absent the previous possibility of lost motion, while the inner clamping band portion 111b now also moves with its tab-like members 131 away from the end of the guide slots 163' near the leg portion 115 of the tightening device 113 toward the right as viewed in FIG. 10. The excess length of the guide slots 170 over the length of the tab-like members 131 can be chosen at will but should preferably not be greater than the distance corresponding to the "initial plastic deformation" in order not to reduce unnecessarily the tolerance range. In practice, it may be advantageous for the excess length n of the guide slots 170 to be slightly less than the "initial plastic deformation" distance of the ear. As the tab-like members 121 remain fixed in their position relative to the guide slots 163' during the "initial plastic deformation" of the ear while the lost motion arrangement is in operation, the step-like portion 167 can now be moved toward the leg portion 115 by a distance corresponding to about a/2 or by a somewhat greater distance leaving a distance $a/2^+$ between point D and the beginning of the step-like portion 167 for precautionary reasons, and the previous distance between points D and F of FIGS. 2–5 can now be reduced by the same distance of about a/2. This, in turn, will permit a reduction in the length of the tongue-like member 161.

By utilizing a lost-motion arrangement in accordance with this invention, it is also possible to determine accurately and thereby optimize the maximum diametric dimension $d_{max}$ for a predetermined tolerance range of a given size clamp. Moreover, if the distance m corresponds substantially to the length of the arc of a clamp having a maximum diameter $d_{max}$ for a given nominal clamp size, such a clamp cannot be installed over a hose whose actual diameter is greater than $d_{max}$ because the tab-like members 121 can no longer be engaged in guide slots 163' due to the shift in position of the inner band portion 111b relative to the outer band portion 111a necessitated by the increased diameter of the hose. This means that by properly choosing the distance n the use of a mechanical connection with the guide arrangement of this invention prevents the installation of a given clamp size over a hose whose diameter is greater than $d_{max}$ of the given clamp size.

Moreover, if only support hooks 131 are used in the mechanical connection according to this invention, the length of the outer band portion from leg portion 114 to the free end of the outer band portion 111a may also be reduced somewhat compared to the mechanical connection 31, 32 and 35 of FIG. 1.

Additionally, if an axial installation of the clamp is desired, the clamp may be preassembled in closed condition by merely bending the outer ends of at least the tab-like members 131. The same may be done with respect to the tab-like members 121 if so desired. Depending on the maximum tensional forces in the clamp and the type of clamping band material, the lost-motion arrangement might also be realized with only a single support hook in the form of a tab-like member.

The lost-motion arrangement of FIG. 13 provides a preassembly position for the clamp once the tab-like members 121 and 131 engage in their respective guide slots 163' and 170 as a result of the frictional engagement between surfaces 121a and 167a and between surfaces 131a and 170a (FIG. 13). The amount of friction between these surfaces can be controlled by the value of dimension m and/or by roughening some or all of these surfaces by conventional means, for example, by using dull cutting edges in the die establishing the surfaces to be roughened.

Figure 21:
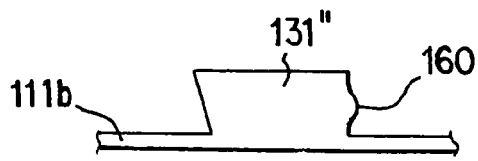
FIG. 21 is a somewhat schematic partial side elevational view, similar to FIG. 15, of a modified embodiment of a tab-like member for the mechanical connection of this invention.
Figure 14:
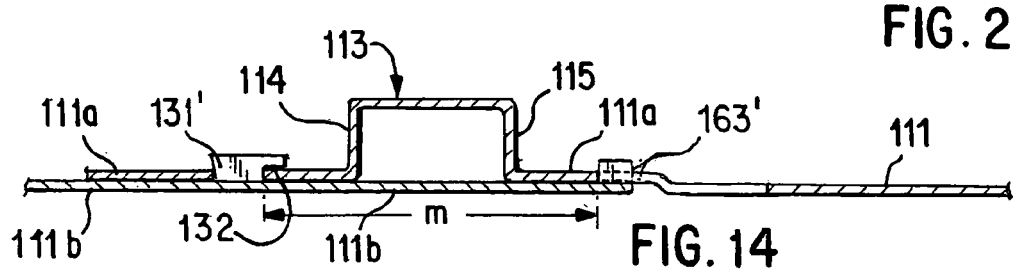
FIG. 14 is a somewhat schematic cross-sectional view, flattened out for better understanding, of a modified embodiment of a clamp with a guide arrangement and with a lost-motion arrangement according to this invention, illustrating the mechanical connection engaged and the tightening device not yet tightened.
Figure 15:
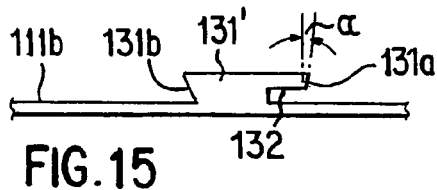
FIG. 15 is a somewhat schematic partial side elevational view, on a larger scale, of the inner clamping band portion with a tab-like member for the mechanical connection provided with an undercut as used in the clamp of FIG. 14.

If a more positive pre-assembly is desired rather than relying on friction alone, the tab-like members 131' may be provided with an undercut 132 (FIGS. 14 and 15) along the inner end of the edge 131a with a radial height somewhat larger than the thickness of the clamping band. The circumferential depth of the undercut 132 may be chosen at will as long as the dimension m is adjusted accordingly as shown in FIG. 14. The leading edge 131b may thereby be inclined forwardly as known in the art to provide a guide function while the trailing edge 131a may be at right angle to the surface of the clamping band. In the alternative, the trailing edge 131a may also be provided with a slight inclination (angle α in FIG. 15) outwardly in the direction toward the ear 113 which in conjunction with the undercut 132 or in lieu thereof may serve as an assist in the attainment of the pre-assembly position. A small nub-like projection 160 in the edge surface 131a (FIG. 21) may serve the same purpose.

Figure 16:
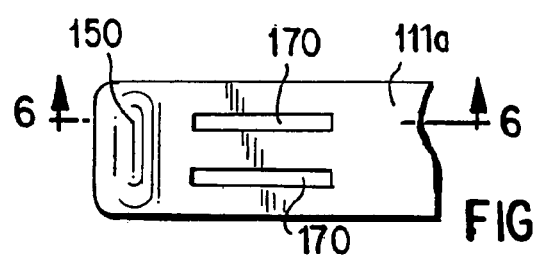
FIG. 16 is a somewhat schematic partial top plan view on a modified embodiment of the free end of the outer clamping band portion provided with a reinforcement according to this invention.
Figure 18:
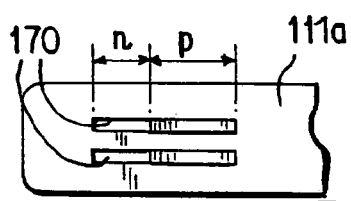
FIGS. 18 and 19 are somewhat schematic partial top plan views on the outer clamping band end portion illustrating the position of the tab-like members of the mechanical connection in the pre-assembly position and in the position of these tab-like members upon reaching the initial plastic deformation position, respectively.
Figure 17:
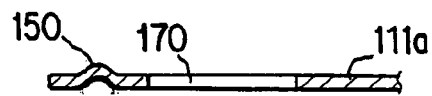
FIG. 17 is a somewhat schematic partial cross-sectional view taken along line 17—17 of FIG. 16.
Figure 19:
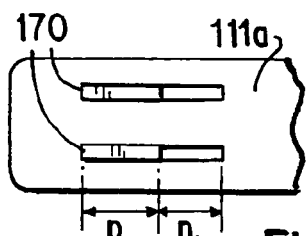

To protect against undesired tearing out of the clamping band material at the end of the guide slots 170 near the free end of the outer clamping band portion 111a, the latter may be provided with one or several cold-deformed, deep-drawn reinforcing means in the form of one or more corrugation-like embossment 150 (FIGS. 16 and 17) in the area between the free end of the outer clamping band portion 111a and the adjacent end of slots 170. In the alternative, an oppositely directed indentation(s) may also be used for the same purpose.

In case the use of two laterally spaced support hooks 131 proves inadequate, one or more so-called deep-drawn support hooks 32 as shown in FIG. 1 herein may also be used in addition thereto. In that case, the aperture for the deep-drawn support hook must also provide a lost-motion for such a support hook to the same extent as the lost-motion for the tab-like members 131. Additionally, two such support hooks may also be used. Furthermore, the lost-motion arrangement may also be used with a mechanical connection as shown in the prior art clamp of FIG. 1. In that case, the circumferential length of the apertures 35 will have to be lengthened.

Figure 20:
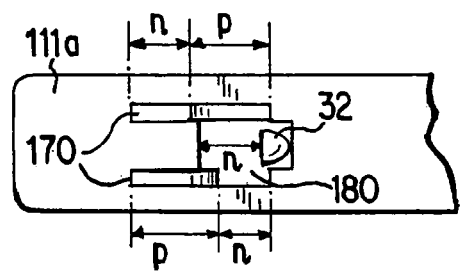
FIG. 20 is a somewhat schematic partial top plan view, similar to FIGS. 18 and 19, on the outer clamping band end portion and illustrating a space-saving arrangement when an additional deep-drawn support hook is used in the mechanical connection.

If an additional deep-drawn support hook is decided upon for the clamp, a space-saving arrangement may be used a shown in FIG. 20 in which the abutment edge of the support hook 32 extends through an opening 180 in the outer clamp portion as shown. The position of a tab-like member 131 in the condition of the clamp with the mechanical connection engaged but prior to tightening the tightening device is shown in the upper part of FIG. 20 while the position of the tab-like member in the lower half corresponds to a contraction of the ear up to and beyond "initial plastic deformation." If the space 180 eliminates altogether the inner clamping band material between the guide slots 170, then the length P of the tab-like members 131 is preferably greater than the length of the removed inner walls of the guide slots so that the tab-like member already extends into a fully formed part of the respective guide slot. This assures proper movement of the tab-like members in the guide slots already at the beginning of contraction of the ear.

Figure 9:
FIG. 9 is a schematic partial side elevational view of the inner clamping band portion with a modified embodiment of a tab-like member according to this invention.
Figure 10:
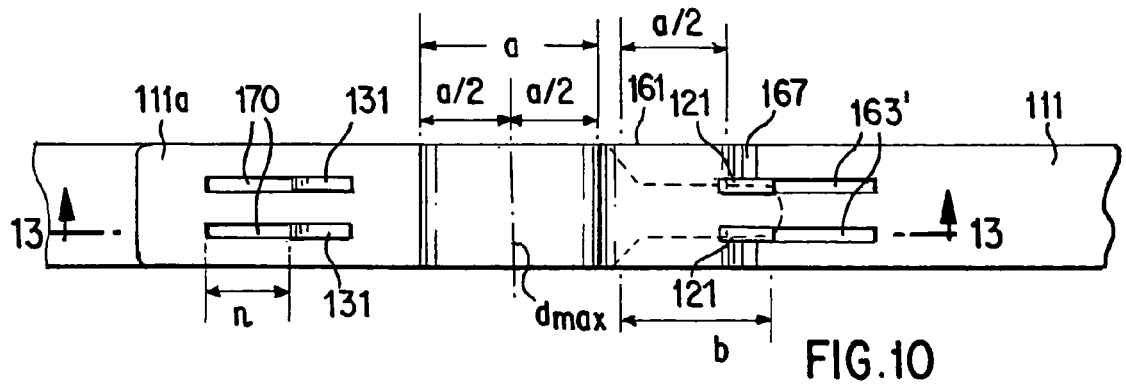
FIG. 10 is a somewhat schematic partial top plan view, flattened out for better understanding, on a part of the outer clamping band portion of a modified embodiment of a clamp in its pre-assembly position and with a so-called lost-motion arrangement in accordance with the present invention, effective during tightening of the tightening device, this Figure illustrating the parts thereof with the mechanical connection and the guide arrangement engaged but prior to tightening of the clamp.
Figure 11:
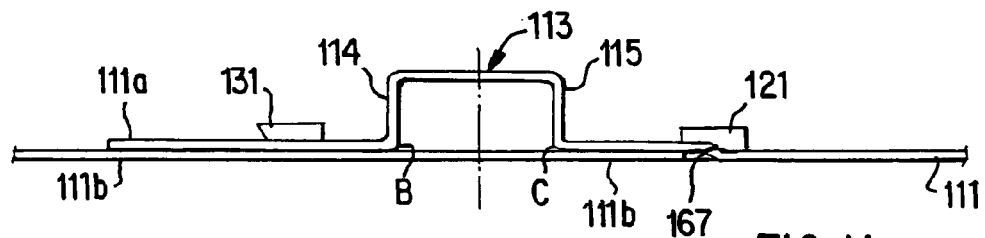
FIG. 11 is a somewhat schematic partial side elevational view of the clamp illustrated in FIG. 10.
Figure 12:
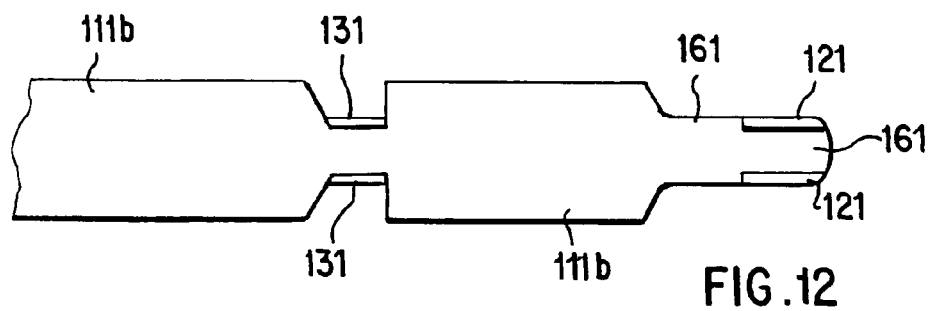
FIG. 12 is a somewhat schematic partial top plan view on a part of the inner clamping band portion of a clamp utilizing the lost-motion arrangement of FIG. 10.

The tab-like members 121 and/or 131 may also decrease in height in the direction toward the tightening device 113 so as to facilitate emplacement of the jaws of the tightening tool in the form of a pincer-like device (see FIG. 9). The reduction in height may thereby resemble the shape of the jaws of the tightening tool, particularly insofar as the tab-like members 121 are concerned in order to permit these tab-like members to be located as close to the tightening device as possible.

While I have shown and described several embodiments in accordance with the present invention, it is understood that the same is not limited thereto, but is susceptible of numerous changes and modifications as known to those skilled in the art. For example, the ear may be modified to provide an extended tolerance range as disclosed in my prior U.S. Pat. No. 6,247,206 either with or without the guide indentations at the inner ends of the leg portions. Furthermore, this invention is also applicable to other tightening devices, such as, for example, screw-type tightening devices as disclosed, for instance, in U.S. Pat. No. 4,521,940. Thus, the present invention is not limited to the details shown and described herein, and I therefore do not wish to be limited to the details shown and described but intend to cover all such changes and modifications as are encompassed by the scope of the appended claims.

What is claimed is:

1. A clamp, comprising clamping band means having clamping band end portions intended to form overlapping inner and outer band portions in the installed condition, a connection in the area of the free end of the outer band portion operable to connect overlapping band portions in the circumferential direction, a tightening device for tightening the clamping band means about an object to be fastened thereby, said tightening device forming a gap in the circumferential direction of the clamping band means, and further means assuring gap-free and stepless internal clamping surfaces of the clamping band means at the end of the inner clamping band portion including a male member near the end of the inner band portion adapted to cooperate with a female member in the outer band portion, said male member having a width less than the full band width and being provided with a bent-up tab-like member on each side thereof, and said outer band portion being provided with two guide slots for engagement by said tab-like members to guide relative movements of the inner and outer band portions during tightening of the tightening device.

2. A clamp according to claim 1, wherein the bent-up tab-like members on each side of the male member are of smaller length than the length of the male member.

3. A clamp according to claim 2, wherein said tab-like members are provided only in the free end area of the male member.

4. A clamp according to claim 1, wherein said tab-like members decrease in height in the direction toward the tightening device.

5. A clamp according to claim 4, wherein said height decrease is curvilinear.

6. A clamp according to claim 1, wherein said tightening device is a plastically deformable ear requiring a predetermined initial plastic deformation to function as tightening device producing predetermined clamping forces and is defined by two outwardly extending leg portions interconnected by a bridging portion, and wherein said bridging portion is provided with reinforcing means.

7. A clamp according to claim 6, wherein said outwardly extending leg portions are substantially parallel to one another.

8. A clamp according to claim 6, wherein said outwardly extending leg portions are non-parallel to one another, and wherein the spacing between the inner ends of the leg portions is greater than the length of the bridging portion.

9. A clamp according to claim 6, wherein, in the non-tightened condition of the clamp with said connection operable to connect overlapping band portions, the full band width of the inner clamping band portion covers said gap and terminates a predetermined distance from the side of said tightening device opposite the free end of the outer clamping band portion, and wherein said female member is defined by a step-like portion in the outer clamping band portion, the beginning of said step-like portion being located from the end of the full band width inner clamping band portion by a distance at least equal to a distance corresponding to maximum tightening of the tightening device.

10. A clamp according to claim 9, wherein said guide slots extend in said outer band portion in such a manner that said male member overlaps said step-like portion at least when said ear has attained its predetermined initial plastic deformation.

11. A clamp according to claim 6, wherein, in the non-tightened condition of the clamp with said connection operable to connect overlapping band portions, the transition from full band width of the inner clamping band portion to the male member is located in the area between said leg portions at a location determined by said predetermined initial plastic deformation, wherein said female member is defined by a step-like portion in the outer clamping band portion, the beginning of said step-like portion being located from the leg portion of the ear remote from the free end of the outer clamping band portion by a distance determined by said predetermined initial plastic deformation, and wherein said guide slots extend in said outer band portion in such a manner that said male member overlaps said step-like portion at least when said ear has attained its predetermined initial plastic deformation.

12. A clamp according to claim 1, wherein said connection includes at least one guide hook and one deep-drawn support hook in the inner clamping band portion operable to engage in apertures in the outer clamping band portion.

13. A clamp according to claim 1, wherein said connection includes two transversely spaced tab-like means bent-up on each side of and forming support hooks in the inner band portion engaging in guide slot means in the outer clamping band portion, and wherein said support hooks are formed by a bent-up tab-like member on each side of the inner clamping band portion.

14. A clamp according to claim 13, wherein said guide slot means are of greater length in the circumferential direction of the clamp than the tab-like means to realize a lost-motion between overlapping band portions during tightening of tightening device so as to at least minimize thereby a decrease in the diametric dimension of the clamp during initial tightening of said tightening device.

15. A clamp according to claim 13, wherein the distance between said guide slots and said guide slot means is such that the tab-like members and the tab-like means can engage in the respective guide slots and guide slot means only when the diameter of a hose does not exceed $d_{max}$ for a given clamp size.

16. A clamp according to claim 13, wherein the connection further includes a cold-deformed, deep-drawn support hook in the inner clamp portion following said tab-like means in the direction opposite the free end of the inner clamping band portion, wherein an opening is formed in the outer clamping band portion in the area of the guide slot means nearer the tightening device through which the deep-drawn support hook can extend and move during the lost-motion operation of the connection.

17. A clamp according to claim 1, wherein the tightening device is a plastically deformable ear requiring a predetermined initial plastic deformation for proper functioning when the clamp reaches its dimension $d_{max}$ of the tolerance range, wherein said connection includes at least one bent-up tab-like member forming a support hook means in the inner clamping band portion engaging in guide slot means in the outer clamping band portion, and wherein each guide slot means is of greater length in the circumferential direction of the clamp than said support hook means to attain a lost motion between said inner and outer clamping band portions during initial contraction of the ear.

18. A clamp according to claim 17, wherein the length of said guide slot means is greater than the length of said support hook means by a distance corresponding at most to the tightening distance necessary to realize the predetermined plastic deformation of said ear.

19. A clamp according to claim 18, wherein said support hook means include two transversely spaced support hook means each formed by a bent-up tab-like member on each side of the inner clamping band portion.

20. A clamp according to claim 18, wherein the tab-like members of said male member and of said support hook means are located in said clamping band means at such a circumferential distance from one another that in the position of said support hook means engaging said guide slot means in the end area thereof nearer the tightening device, the tab-like members of said male member are in a position engaging said guide slots in the end area thereof nearer the tightening device.

21. A clamp according to claim 18, wherein the tab-like members of said male member have a length less than the length of said male member.

22. A clamp according to claim 17, further comprising preassembly means for reducing the risk of reopening of the clamp after said tab-like means have engaged in said guide slot means.

23. A clamp according to claim 22, wherein said preassembly means includes an undercut in the edge of the support hook means near said tightening device.

24. A clamp according to claim 22, wherein said preassembly means has a nub-like projection at the rear end thereof and extending toward said tightening device.

* * * * *